United States Patent [19]
Ohira

[11] 4,291,345
[45] Sep. 22, 1981

[54] CASSETTE TYPE TAPE RECORDER

[75] Inventor: Tsunehisa Ohira, Sagamihara, Japan

[73] Assignee: Victor Company of Japan, Ltd., Yokohama, Japan

[21] Appl. No.: 73,526

[22] Filed: Sep. 7, 1979

[30] Foreign Application Priority Data

Sep. 12, 1978 [JP] Japan .......................... 53/124993[U]
Sep. 12, 1978 [JP] Japan .......................... 53/124994[U]

[51] Int. Cl.³ .............................................. G11B 15/12
[52] U.S. Cl. .......................................... 360/62; 360/61
[58] Field of Search ....................... 360/61, 62, 60, 137

[56] References Cited
U.S. PATENT DOCUMENTS

| | | | |
|---|---|---|---|
| 3,454,731 | 7/1969 | Hori et al. | 360/61 |
| 3,581,022 | 5/1971 | Sagamihara et al. | 360/60 |
| 3,800,327 | 3/1974 | Okita et al. | 360/60 |
| 3,921,214 | 11/1975 | Nyffenegger | 360/60 |
| 4,130,843 | 12/1978 | Miyamoto et al. | 360/60 |

Primary Examiner—Vincent P. Canney
Attorney, Agent, or Firm—Haseltine and Lake

[57] ABSTRACT

A cassette type tape recorder provided with a manually operated control member for operating a record circuit when the tape recorder is to be set in the record mode, and a main control member to be switched over and set in play, stop, and rewind positions, further comprising a lock mechanism for locking the record control member in the operative position, a mechanism for setting said main control member in a specific position between play position and rewind position, a mechanism for releasing said lock mechanism when said main control member is manually operated to a position set by said setting mechanism, and a rewind mechanism which operates when said main control member passes the position set by said setting mechanism and is set in rewind position. In accordance with this structural organization, it becomes possible to release the locked record control member without any accidental rewinding of tape.

11 Claims, 16 Drawing Figures

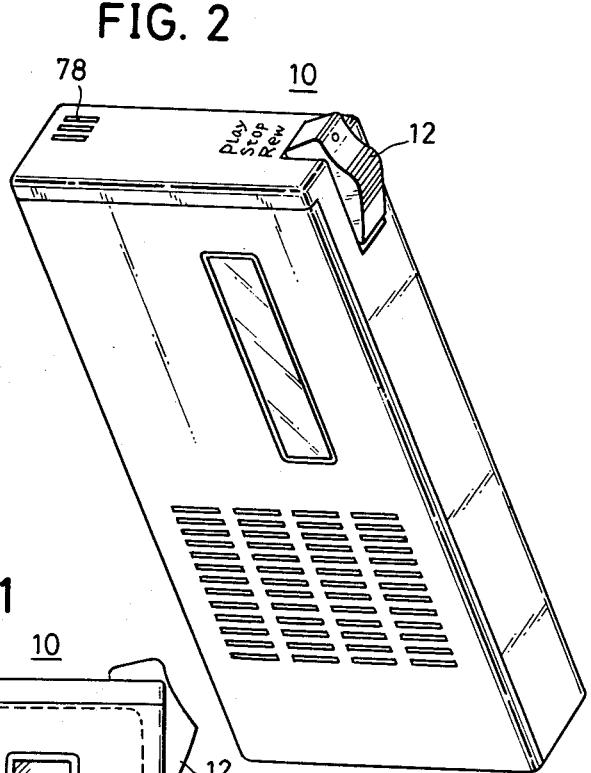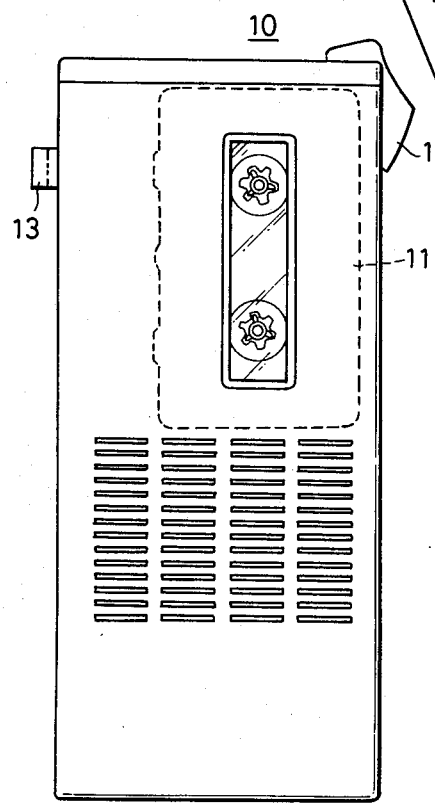

CASSETTE TYPE TAPE RECORDER

BACKGROUND OF THE INVENTION

The present invention relates to cassette type tape recorders and more particularly to a cassette type tape recorder capable of surely releasing the locked state of a record button for putting the tape recorder in a record mode.

In general, a cassette type tape recorder adapted for dictation-recording using a small-size tape cassette has been designed so that a single manually operated control knob is used for putting the tape recorder in any of the play, stop, and rewind modes, and a manually operated record button is additionally provided for changing between recording and playing. For instance, for recording, the record button is pushed to be locked in the record mode position. The control knob is then switched between a play position and a stop position thereby causing the tape to travel and to stop respectively. According to this manual operation, dictation sound can be recorded as desired.

When the recorded sound is to be reviewed, the operator turns the control knob to its rewind position to put the cassette type tape recorder in the rewind mode and lets a desired amount of tape travel in the reverse direction; then the same control knob is turned to the play position again, and the tape recorder assumes a play mode state. Here, if the record button is kept depressed, the tape recorder is put in the record mode whereupon the control knob is set at the above play position, with the result that pre-recorded sound is erased unavoidably.

Accordingly, for eliminating the above described difficulty, the cassette type tape recorder of this type has been adapted so that locked state of the record button is set free automatically in response to manual operation of the control knob to the rewind position. This means that, when the cassette type tape recorder is in the record mode, a series of operations of the control knob to the rewind position and then to the original play position is capable of positively changing the record state of the cassette type tape recorder to the play mode via the rewind mode.

On the other hand, to release the tape recorder from the record mode in a case such as that where the recording is to be stopped for a long period of time, or where the recording is completed, the record button is required to be set free. In the cassette type tape recorder of the above described construction, only for returning the record button, it is necessary to turn the control knob until it reaches the rewind position. Therefore, there arises a problem in that the tape is unavoidably rewound a little, when the control knob is operated as described above. Once the tape has been rewound, the subsequent recording operation results in the last part of the sound prerecorded is inevitably erased, and the erased sound is unable to be reproduced.

In addition, as a mechanism for rotating the supply reel shaft at high speeds in the rewind mode state, a gear train mechanism has been adopted for assuring positive operation. The conventional cassette type tape recorders have not been provided with any special mechanism for appropriately adjusting the time instant when the drive gear comes to mesh with the driven gear in a relationship corresponding to the time instant when the motor starts.

Accordingly, there is a possibility that the motor starts to drive before the drive gear comes to mesh fully with the driven gear, when the control knob is turned to the rewind position. Therefore, difficulties arise in that the gear train mechanism generates noise at the time when the tape starts to travel, and further that the tape does not travel stably due to insufficient power transmission by the gear train mechanism.

SUMMARY OF THE INVENTION

Accordingly, it is a general object of the present invention to provide a novel and useful cassette type tape recorder which overcomes the above mentioned difficulties.

Another and more specific object of the present invention is to provide a cassette type tape recorder in which a control knob is adapted to be set to a newly provided record release position between the stop position and the rewind position, where the locked state of the record button is released with the tape stopped. According to this tape recorder, no undesired tape rewinding occurs in response to the record releasing operation, so there is no erasing of the last part of the sound which has been recorded previously in the subsequent recording operation.

Still another object of the present invention is to provide a cassette type tape recorder in which the time instants when the motor starts and when the gears mesh with each other in response to the manual operation for putting the tape recorder in the rewind mode can be easily adjusted so that the gears mesh with each other before the motor starts. Accordingly, in the rewind mode, the motor drives the reel by way of the gear train with high stability.

Additional objects and features of the present invention will become apparent from the following detailed description when read in conjunction with the accompanying drawings.

BRIEF DESCRIPTION OF THE DRAWINGS

In the drawings:

FIG. 1 and FIG. 2 are an elevational view and a perspective view respectively showing an external shape of one embodiment of a cassette type tape recorder of the present invention;

FIGS. 6(A) and 6(B) through FIGS. 9(A) and 9(B) are bottom views of a principal part of a manual operation mechanism of the cassette type tape recorder of the present invention, in their modes of being set to play (record), stop, record release, and rewind positions respectively;

DETAILED DESCRIPTION OF THE INVENTION

Figure 3:
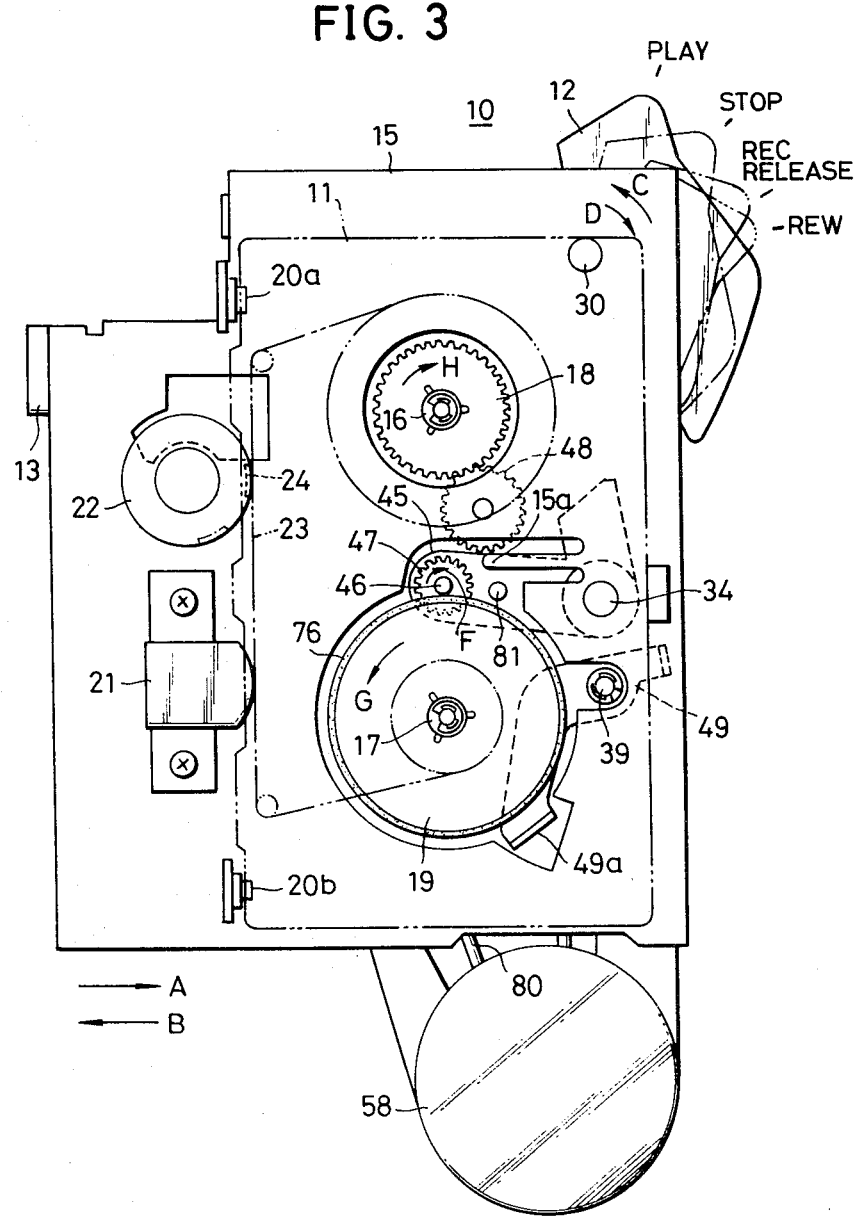
FIG. 3 and FIG. 4 are a plan view and a bottom view respectively showing mechanisms on upper and lower sides of a chassis of the cassette type tape recorder shown in FIG. 1 in its recording mode.

A description is first given of the manner of operating the controls of a cassette type tape recorder of the present invention.

FIG. 1 and FIG. 2 show a compact cassette type tape recorder 10 adapted for recording dictated sound, which is loaded with a miniature tape cassette 11. At the top of the righthand side of the tape recorder 10, there is provided a manually rotatable control knob 12 which can be manipulated by an operator with just the thumb of his right or left hand which holds the tape recorder 10. The tape recorder 10 can be set to play, stop, record (button) release and rewind positions by moving control knob 12 successively in the clockwise direction. Near the top of the lefthand side of the tape recorder 10, there is provided a record button 13, which can be pushed with theoperator's index finger.

In recording dictation, the record button 13 is pushed in and locked in its depressed position as indicated by a two-dot chain line in FIG. 1, and the knob 12 is set in play position. When recording is to be interrupted or stopped, the knob 12 is moved to stop position. When recording is to be resumed, the knob 12 is moved to play position. By carrying out the above described cyclic manipulation repeatedly, dictated sound can be recorded successively on the tape in the cassette 11.

When the recorded sound is to be reviewed, the knob 12 is moved past the record release position to rewind position for rewinding the tape, and then on to the play position. When the knob 12 passes the record release position on the way to the play position, the record button 13 is released automatically. Thus, when the knob 12 is moved to the play position, the tape recorder 10 assumes the play mode.

The construction of the tape recorder 10 of the present invention is such that, in addition to the above described manual operation, the knob 12 can be set in a click-stop manner to the record release position preceding the above described rewind position. When the operator desires to stop recording dictation, the knob 12 is moved to record release position. This manipulation frees the record button 13 from its locked state, so it returns to its original position. Accordingly, the recording release is effected without any unwanted tape rewinding. When the force being applied to the knob 12 is released, that is, when the thumb is taken off the knob 12, the knob 12 automatically returns to the stop position, whereby the tape recorder 10 is restored to its original inactive state.

Next, a concrete structure of the cassette type tape recorder 10 shown in FIGS. 1 and 2 will be described.

A supply reel shaft 16 and a take-up reel shaft 17 are disposed on a chassis 15 to project above the top thereof. The supply reel shaft 16 is formed unitarily with a gear 18, which serves as a reel disc. The take-up reel shaft 17 is formed unitarily with a reel disc 19.

The miniature cassette 11 is smoothly loaded into the proper position with its pair of spools respectively engaged with the reel shafts 16 and 17, and with the positioning holes in its front side surface engaged with guide projections 20a and 20b. When the cassette 11 is loaded, as a magnetic tape 23 moves along the front side of the cassette 11 it makes contact with a recording and reproducing magnetic head 21 fixedly mounted on the chassis 15 and with a cylinder 22 swingably provided on the chassis 15. An erasing head 24 is embedded in the lateral periphery of the cylinder 22.

Figure 6A:
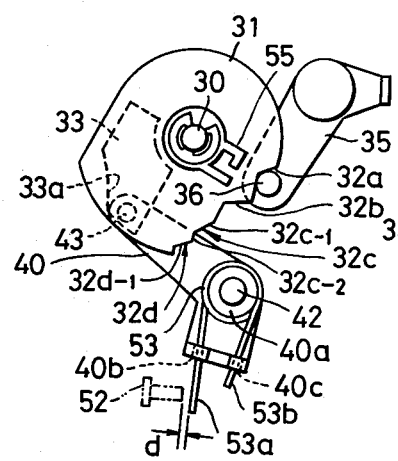
Figure 10:
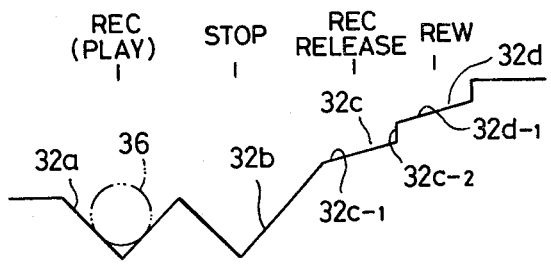
FIG. 10 is an expanded view showing a profile of cam parts on a rotary cam disc in the cassette type tape recorder of the present invention.

The control knob 12 is screw fastened to a rotary cam disc 31 journalled on a pin 30 embedded in the chassis 15. The rotary cam disc 31 has two V-shaped cam parts 32a and 32b and two L-shaped cam parts 32c and 32d formed successively on its lateral surface, a cam groove 33 (FIG. 6(A)) in its upper surface and a cam groove 34 (FIG. 6(B)) in its lower surface. FIG. 10 is profile view of the cam parts 32a through 32d in their expanded form.

When the knob 12 is rotated, a pin 36 on an arm 35 comes to fit successively into the cam parts by the action of a coil spring 37, whereby the knob 12 is set in the respective positions PLAY, STOP, REC.RELEASE, and REW in a click-stop manner, as will be described later. The profile of each cam part 32a through 32d is designed so that, at both PLAY and STOP positions, the knob 12 is held in position, but at both REC.-RELEASE position and REW position, when set free from the manipulative force, the knob 12 automatically returns to STOP positon where the pin 32 comes to fit into the V-shaped cam part 32b.

With respect to the cam grooves 33 and 34, there are provided a first control arm 40 and a second control arm 41 respectively, which are pivoted coaxially on a pin 42 embedded in the lower surface of the chassis 15. Pins 43 and 44 at the free ends of the arms 40 and 41 fit into the cam grooves 33 and 34 respectively, so that the arms 40 and 41 can turn independently in response to rotation of the rotary cam disc 31, as will be described later. The function of the first control arm 40 is to control rotation of L-shaped arm 45 and thereby to control contact and separation of drive shaft 46 with and from the reel disc 19, and further to control meshed engagement and separation of drive gear 47 with and from an intermediate gear 48. The second control arm 41 serves to control rotational position of a brake arm 49.

The L-shaped arm 45 is pivoted on a pin 50, and the drive shaft 46, drive gear 47, and flywheel 51 are rotatably supported at the distal end of one arm part 45a. The other arm part 45b of the arm 45 has a U-shaped cross section, and has an adjusting screw 52 tightly screw-engaged in a vertical wall part thereof. One free arm part 53a of a torsion spring 53 is fitted around a bushing 40a on the first control arm 40 and enters into the U-shaped cross sectional arm part 45b and faces the distal end of the adjusting screw 52. The torsion spring 53 is fitted with free arm parts 53a and 53b respectively engaged in cutouts 40b and 40c formed in a bent part of the arm 40, with a torsion force being stored therein. The torsion spring 53 has spring constant which is somewhat larger than that of a coil spring 54 for urging the arm 45 to turn clockwise in FIG. 5.

Interrelatedly with clockwise turning of the arm 40, the free arm part 53a of the torsion spring 53 comes to abut against and push the distal end of the adjusting screw 52, and the arm 45 is thereby turned. In this connection, any change in the screw-in amount of adjusting screw 52 will lead to a corresponding change in the time instant when the arm 45 starts to turn. The screw-in amount of the adjusting screw is generally adjusted so that each part performs the predetermined operation at the time when the tape travel condition is changed over and when the operational state of the tape recorder is switched over. More concretely, adjustment is made so as to satisfy the following conditions.

1. Recording (Reproducing) mode:

A drive shaft 46 is caused to press against the peripheral surface of the reel disc 19, with the distal end of the adjusting screw 52 separated from the free arm part 53a of the torsion spring 53 by an appropriate distance.

2. Stop mode:

The drive shaft 46 is separated from the reel disc 19, and the drive gear 47 is also separated from the intermediate gear 48.

3. Rewinding mode:

The drive gear 47 comes to mesh with the intermediate gear 48 at a time preceding that when a switch described later closes. Further, at the time the gears are being meshed with each other, the torsion spring 53 is forced to make further resilient deformation.

Figure 6B:
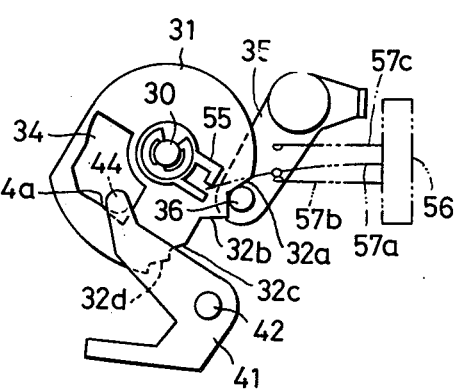

On the rotary disc 31, there is further formed a recessed arm 55 for opening-closing and changing over a switch mechanism 56. The switch mechanism 56 is disposed with a free end of a center leaf contact 57a entered into the recessed arm 55, as indicated in FIG. 6(B). The switch structure 56 further has leaf contacts 57b and 57c on either side of the leaf contact 57a respectively. When the knob 53 is turned, the center leaf contact 57a makes contact either with the leaf contact 57b or with the leaf contact 57c, thus causing the motor 58 to start rotating, as will be described later in detail.

The record button 13 is fixed to a slide plate 60 on the lower surface of the chassis 15. This slide plate 60 is urged to displace in the direction of arrow B by means of a tension force of the coil spring 61. A lock arm 62 is pivotally supported on a pin 63 fixed to the lower surface of the chassis 15, and is urged to turn clockwise in FIGS. 4 and 5 by a coil spring 64. The lock arm 62 and the rotary cam disc 31 are connected to each other by a connecting rod 65 of small diameter. A ring part 65a at one end of this connecting rod 65 is fitted around a pin 66 embedded in the rotary cam disc 31 and the other end is passed through a hole 62c in a bent part 62a of the lock arm 62 and is further bent as designated by 65b. A distance L between the ring part 65a and the bent part 65b is determined so that, when the knob 12 is set in its record button release position, the lock arm 62 is caused to turn to a position where it frees slide plate 60 from its locked state. The lock arm 62 has a hook 62b which faces the side surface of an arm part 60a of the slide plate 60.

Now an explanation will be given as to how the tape recorder 10 is put into the record, play, record button release, and rewind modes and as to how the tape recorder operates in these modes.

RECORD⇌STOP (FIGS. 3, 4, 6(A), 6(B), 7(A) and 7(B))

When the tape recorder 10 is to be set to record mode, the record button 13 is pushed and locked and the knob 12 is set in position PLAY.

Figure 4:
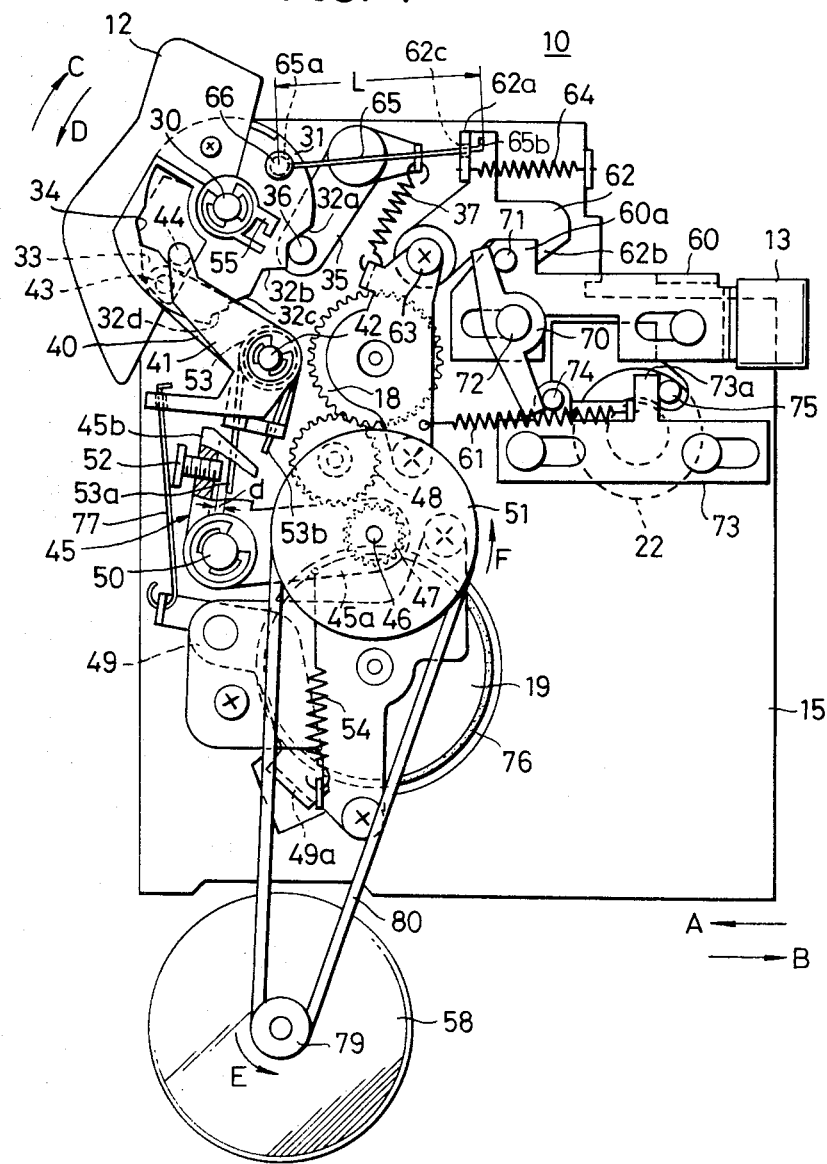

The slide plate 60 is shifted in the direction of arrow A and the arm part 60a thereof comes into latched engagement with the latch part 62b of the lock arm 62, as illustrated in FIG. 4. This manual operation causes the record button 13 to be locked in its depressed position, and a record switch (not shown) to be switched over to operate a recording circuit. Furthermore, when the slide plate 60 is shifted as described above, a rotatable arm 70 is pushed by a pin 71 to be turned counterclockwise about a pin 72. This turning of the rotatable arm 70 causes a slide lever 73, with its pin 74 pushed by the arm part of the arm 70, to be slid counter to the force of the coil spring 61 in the direction of arrow B. A lug 73a of the slide plate 73 pushes a pin 75 fixed to the bottom of the cylinder 22, thus causing the cylinder 22 to turn counterclockwise in FIG. 3 counter to a spring (not shown). The erasing head 24 thereby moves from a position indicated by a single-dot chain line to a position indicated by a full line, and comes to make contact with the tape 23.

The knob 12 is turned in the direction of arrow C to the position PLAY and is held in this position by the cooperative action of the pin 36 and the V-shaped cam part 32a.

As one result of this manual operation, the pin 43 is set free from contact engagement with cam surface 33a of the cam groove 33, and the arm 40 is thereby allowed to turn counterclockwise. Accordingly, the arm 45 becomes free from engagement with the arm part 53a of the torsion spring 53 and is allowed to be turned clockwise by the coil spring 54. As a result, the drive shaft 46 is pressed against a rubber wheel 76 fitted around the reel disc 19 by the force of the coil spring 54. In this state, a gap d is now established between the arm part 53a of the torsion spring 53 and the end of the adjusting screw 52.

As another result of the above manual operation, the pin 44 is engaged with the cam groove 34 and the arm 41 is thereby turned clockwise. As a result, the brake arm 49 is caused to turn clockwise in FIG. 5 counter to a spring (not shown) by way of a connecting rod 77, and a bent brake part 49a thereby separates from the reel disc 19. Thus, the braking force against the take-up reel shaft 17 is released.

As still another result of the above manual operation, the center leaf contact 57a is engaged with the recessed arm 55 and is thereby deformed to make contact with the leaf contact 57b, as illustrated in FIG. 6(B). Accordingly, the motor 58 starts to drive, thus rotating a pulley 79 in the direction of arrow E. When the motor 58 is driven, a flywheel 51 is rotated, together with the drive shaft 46 and the drive gear 47, at a predetermined speed in the direction of arrow F by way of the pulley 79 and an endless rubber belt 80. Moreover, the take-up reel shaft 17 is rotated in the direction of arrow G.

Accordingly, the magnetic tape 23 in the cassette 11 is taken up on the take-up spool to move in the normal direction. As the tape travels, dictation sound introduced through a built-in microphone 78 (FIG. 2) is recorded thereon by the magnetic head 21.

When the dictation sound recording operation is to be stopped, the knob 21 is manually turned in the direction of arrow D to the original STOP position. The knob 12 is held in the STOP position by the cooperative action of the pin 36 and the V-shaped cam 32b.

Figure 7A:
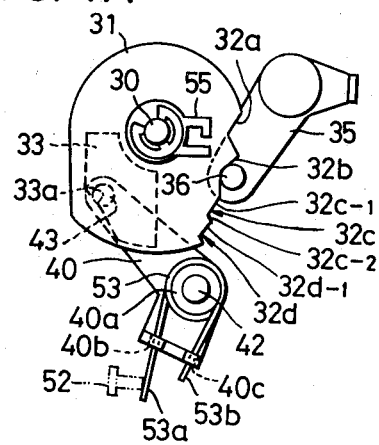

As one result of this manual operation, the arm 40 is caused to turn clockwise with the pin 43 being engaged with the cam surface 33a, as illustrated in FIG. 7(A). As the arm 40 turns, the arm part 53a of the spring 53 abuts against the adjusting screw 52 and pushes it, thus causing the arm 45 to turn counterclockwise in FIG. 4 counter to the spring 54. Accordingly, the drive shaft 46 separates from the reel disc 19, and a drive transmission path to the take-up reel shaft 17 is thereby opened.

As another result of the above manual operation, the arm 41 is allowed to turn clockwise with the pin 44 being released from engagement with a cam surface 34a. Accordingly, the brake arm 49 is turned by a spring (not shown), and a brake part 49a presses against the lateral surface of the reel disc 19, thus applying a braking force thereto.

Figure 7B:
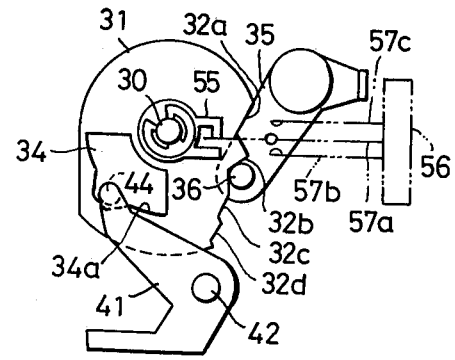
Figure 8A:
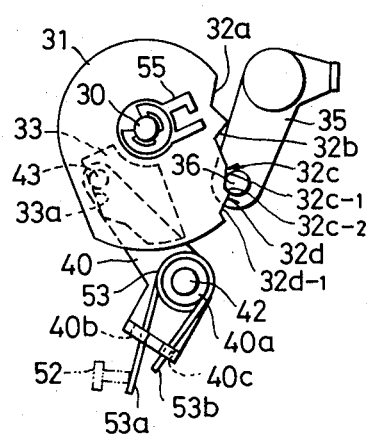
Figure 8B:
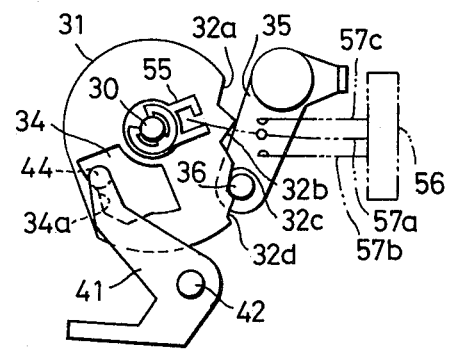

As still another result of the above manual operation, the leaf contact 57a separates from the leaf contact 57b, as illustrated in FIG. 7(B), so the supply of current to the motor 58 is cut off and recording ceases.

Therefore, the switching back and forth between the record and the stop modes can be carried out easily by a one-step turning of the knob 12.

RECORD→RECORD (BUTTON) RELEASE
(FIGS. 3, 4, 5, 8(A), 8(B), and 10)

When the record button is to be released, the knob 12 is turned together with the rotatable disc 31 in the direction of arrow D, passing the STOP position, to the REC.RELEASE position. The knob 12 can be securely set in the REC.RELEASE position with the pin 36 pushing an angled surface 32c-1 and engaged with a step-rise surface 32c-2 of the cam part 32c, without any risk of accidental activation of rewinding. That is, for turning the knob 12 to the REW position, it is further required to apply enough additional force to the knob 12 to cause the pin 36 to ride over the step-rise surface 32c-2 to an angled surface 32d-1 of the succeeding cam part 32d. This requirement of additional force in manual operation effectively eliminates accidental turning of the knob 12 to the REW position.

When the rotatable disc 31 is turned, passing the rotational position indicated in FIG. 7, to the position indicated in FIG. 8, the lock arm 62 is engaged with the bent part 65b of the connecting rod 65 and is forced to turn counterclockwise in FIG. 4 counter to the force of the spring 64. As the lock arm 62 turns, the hook 62b is disengaged from the arm part 60a, thereby causing the slide plate 60 and the record button 13 to return in the direction of arrow B. Furthermore, the slide level 73 is allowed to slide back in the direction of arrow A, thereby causing the cylinder 22 to turn thus separating the erasing head 24 from the magnetic tape 23.

Furthermore, when the knob 12 is operated as above, the arm 40 turns further clockwise, and the arm 45 is then turned further counterclockwise, whereby the gear 47 comes to mesh with the intermediate gear 48. The switch mechanism 56 assumes a state indicated in FIG. 8(B), where the center leaf contact 57a does not deform enough to reach the leaf contact 57c and so is still separated from the leaf contact 57c. The motor 58 stays off.

Accordingly, in manual operation of turning the knob 12 to the REC.RELEASE position, it becomes possible to release the record button 13 from its locked state without any displacement of the tape. Therefore, any difficulty such as slight rewinding of the tape can be positively prevented from occurring upon release from the recording state and thus there is no risk of undesired erasing of the last part of the pre-recorded signal when recording is carried out again.

When the force being applied to the knob 12 is removed, the knob 12 returns automatically to the STOP position, due to action of the pin 36 pushing against the angled surface 32c-1 of the cam part 32c.

RECORD→REWIND→STOP→PLAY (FIGS. 3, 4, 5, 9(A), 9(B), and 10)

When the recorded sound is to be reviewed, the tape recorder 10 is put in the rewind mode, and then is set for playing mode.

In changing from record mode to rewind mode, the knob 12 is turned in the direction of arrow D, passing the REC.RELEASE position, to the REW position. The knob 12 is set in position by cooperative action of the pin 36 and the cam part 32d.

At the time the knob 12 is turned up to the REC.-RELEASE position, the record button 13 is released from its locked state and is returned as in the preceding case.

Figure 9A:
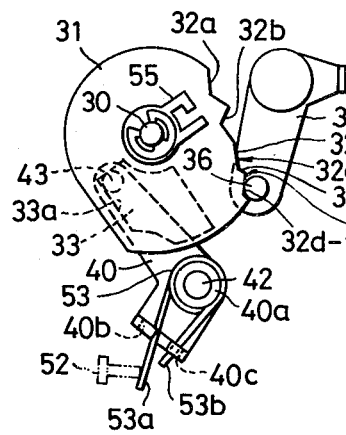

As one result of the above manual operation of the knob 12, the arm 40 is turned to a position indicated in FIG. 9(A). This position is a position shifted further in the clockwise direction from the position indicated in FIG. 8(A). The arm 45 is restricted in its rotation in clockwise direction in FIG. 3 (in counterclockwise direction in FIG. 4) by engagement of a pin 81 embeddedly fixed to one arm part 45a with a stop arm 15a formed at a specific part of the chassis 15. Accordingly, the arm 45 can be held positively in the above described rotational position, while being urged with the rotational force in the above described direction by the spring force stored in the torsion spring 53. This rotational position of the arm 45 is predetermined so that the gear 47 meshes with the gear 48 with a normal depth of mesh.

Figure 9B:
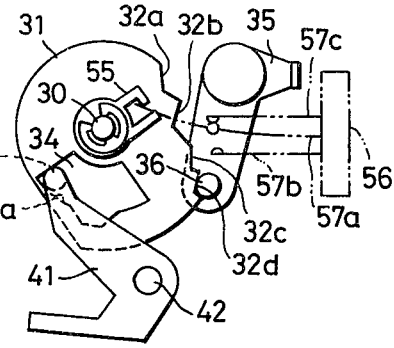

As another result of the above manual operation of the knob 12, the arm 41 is turned clockwise as indicated in FIG. 9(B), and the brake arm 49 is then turned to release the braking force on the reel disc 19, similarly as in the preceding record state.

Furthermore, when the knob 12 which has passed the REC.RELEASE position is turned up to the REW position, the center leaf contact 57a makes contact with the leaf contact 57c, as indicated in FIG. 9(B), thus starting the motor 58. The motor 58 is driven in the same direction (of arrow E) as in the preceding recording mode.

The rotation of the motor 58 is transmitted successively by way of the pulley 79, belt 80, flywheel 51, drive gear 47, and intermediate gear 48 to the gear 18, thus rotating the supply reel shaft 16 in the direction of arrow H. Accordingly, the magnetic tape 23 in the cassette 11 is taken up on the supply spool. Thus, the tape recorder 10 assumes the rewind mode.

Here, at the time when the motor 58 starts, the gear 47 has been in meshed engagement with the gear 48, as described above. Accordingly, operation of transmitting rotational force of the motor 58 to the supply reel shaft 16 is carried out positively from the initial period of the rewinding mode. Therefore, there is no inappropriate engagement between the gear 47 and the gear 48 and its resultant noise.

Moreover, the gear 47 is in meshed engagement with the gear 48 while being urged to move toward the gear 48 by the spring force of the torsion spring 53. Accordingly, even though a force is applied to the gear 47 in the direction separating it from the gear 48 when the rotational force is being transmitted, no trouble such as unmeshing of the gears 47 and 48 occurs.

Furthermore, the gear 47 can be accurately held in a meshed state with the gear 48 at the normal depth of mesh by cooperative action of the pin 81 and the stop arm part 15a. Therefore, no excessive load is generated at the part transmitting rotation from the gear 47 to the gear 48.

According to the forgoing operation, the tape rewinding operation can be performed smoothly.

When as much tape as desired has been rewound, the knob 12 is set free from manual operation. The knob 12 thereupon returns, passing by the REC.RELEASE position, to the STOP position, due to the action of the pin 36 pushing against an angled surface 32d-1 of the cam part 32d. Thus, the operation of the tape recorder 10 is stopped.

Figure 5:
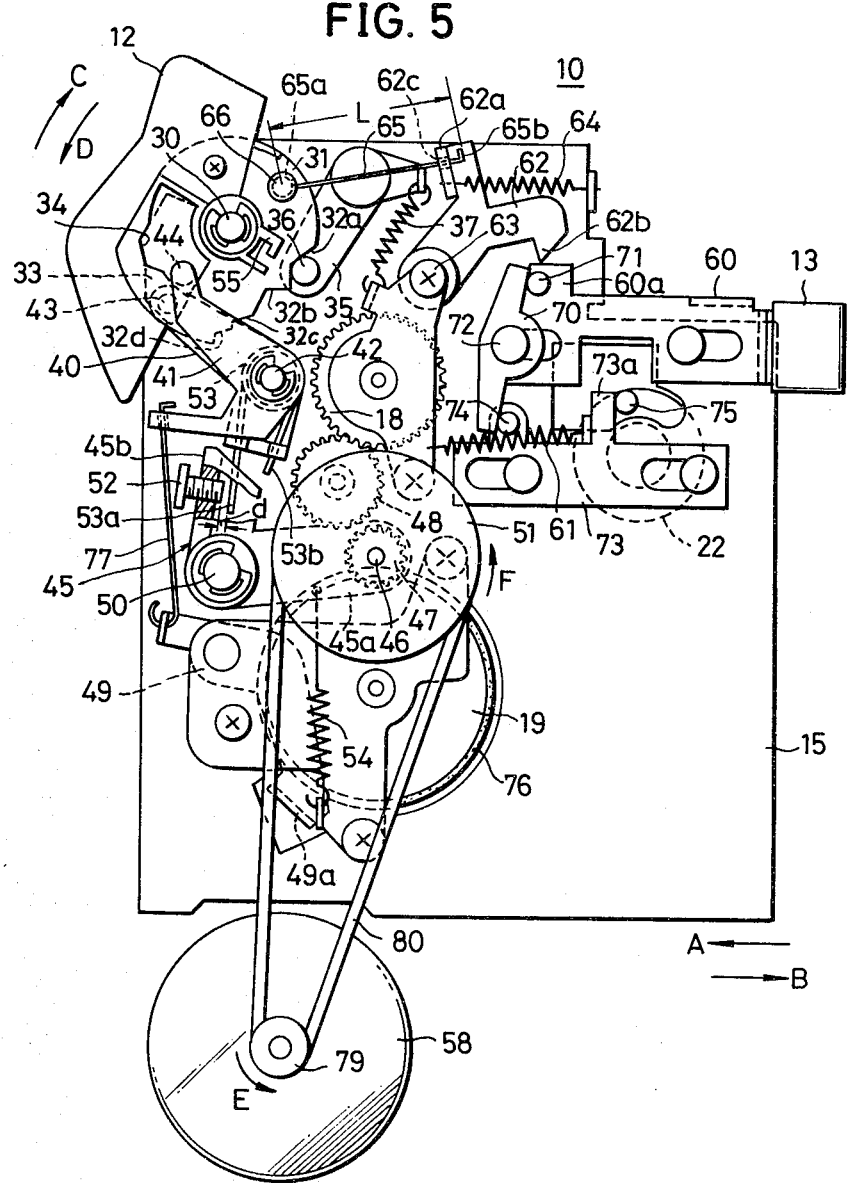
FIG. 5 is a bottom view showing the mechanism on the lower side of the chassis of the cassette type tape recorder of the present invention in its play mode.

When the knob 12 is further manually turned counterclockwise to the PLAY position while in this stopped state, the tape recorder 10 is put into the play mode indicated in FIG. 5 (which state is the same as the record mode indicated in FIG. 4 except that the record button 13 is returned). The dictation sound signal recorded on the rewound portion of the tape is now reproduced.

Figure 11A:
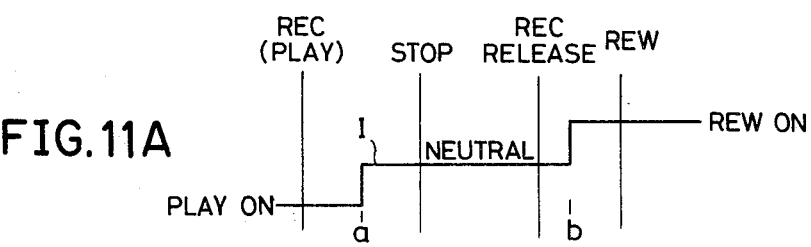
FIGS. 11(A) and 11(B) are time charts showing time instants when a motor switch closes and when gears come to mesh with each other.
Figure 11B:
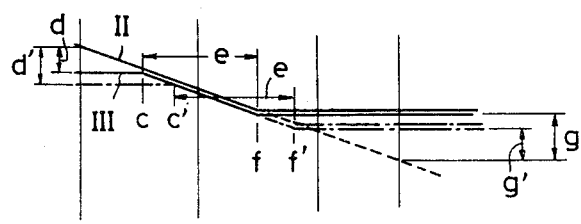

Next, with reference to FIGS. 11(A) and 11(B), a timing description is given of the motor's starting and the gears' meshing in the above described tape recorder.

Referring to FIG. 11(A), graph I indicates timings when the switch mechanism 56 opens and closes. The contact and separation of the center leaf contact 57a to and from the leaf contact 57b at the time of manual recording operation take place at a time instant a, and the contact and separation of the center leaf contact 57a to and from the leaf contact 57c at the time of manual rewinding operation take place at a time instant b.

Referring to FIG. 11(B), graphs II and III respectively indicate how position and displacing locus of the arm part 53a of the torsion spring 53 and the adjusting screw 52 change, when the knob 12 is manually turned. In the record (play) state, the arm part 53a and the adjusting screw 52 are separated from each other by a distance d (which corresponds to d in FIG. 4). At a time instant c before the knob 12 reaches the STOP position, the arm part 53a comes to abut against the screw 52. Then, the arm part 53a pushes the screw 52 to turn the arm 45 through a predetermined angle e of rotation. When the arm 45 turns by an angle e, the gear 47 comes into meshed engagement with the gear 48 at a time instant f. Thereafter, the arm part 53a is forced to undergo resilient deformation as the control arm 40 turns further. The amount of deformation of the arm part 53a in the rewind mode is represented by g. Here, the time instant f precedes the time instant b.

Here, when the screw-in distance of the adjusting screw 52 is supposed to be varied, for example, to be decreased, the graphs II and III become as indicated by single-dot chain lines. In this connection, the time instant c is shifted to c', and the time instant f to f'. The spaced distance between the arm part 53a and the adjusting screw 52 in the record mode becomes d', and the amount of deformation of the arm part 53a in the rewind mode of state becomes g'.

In view of the above, it will be understood that factors such as the timing when the gear 47 comes into meshed engagement with the gear 48 and the force of meshed engagement between the gears 47 and 48 can be appropriately adjusted by adjusting screw-in distance of the adjusting screw 52.

Further, this invention is not limited to this embodiment but various variations and modifications may be made without departing from the scope of the invention.

What is claimed is:

1. In a cassette type tape recorder provided with a record control member manually operated for operating a record circuit when the tape recorder is to be set in the record mode, and a single main control member to be switched over and set in play, stop, and rewind positions, which are arranged in named order the improvement comprising:

a lock mechanism for locking said record control member in the operative position;

a mechanism for setting said main control member in a click stop manner in a specific record release position intermediate the stop position and the rewind position;

a mechanism for releasing said lock mechanism when said main control member is manually set in said specific position; and a rewind mechanism operated when said main control member passes said specific position and is set at the rewind position.

2. A cassette type tape recorder as claimed in claim 1 in which said lock releasing mechanism comprises a rod provided for connecting said main control member and a lock arm for locking said record control member in its operative position, whereby when the main control member is manually put in said specific position said lock arm is caused to displace to its inoperative position by way of said connecting rod.

3. A cassette type tape recorder as claimed in claim 1 in which said setting mechanism comprises a cam part formed in said main control member, and a pin member on which is exerted a force in the direction of pushing against said cam part.

4. A cassette type tape recorder as claimed in claim 3 in which said cam part has a step part for pushing said pin member up as said main control member is displaced to the rewind position, said step part thus offering resisting force in cooperation with said pin member with respect to manual operation of said main control member through said specific position.

5. A cassette type tape recorder as claimed in claim 3 in which said cam part has an angled surface adapted to receive pushing force from said pin member, the force of said pin member pushing said angled surface urging said main control member to return to the stop position, and said main control member being automatically returned to the stop position whereupon it is released.

6. A cassette type tape recorder as claimed in claim 1 in which said rewind mechanism comprises:

a switch adapted to be closed responsive to manual operation of said main control member to the rewind position to start a motor; and a drive-force transmitting mechanism having an adjusting member therein and being set in such a manner that a drive-force transmitting path is established before the main control knob reaches the rewind position.

7. A cassette type tape recorder as claimed in claim 6 in which said drive-force transmitting mechanism comprises:

a rotatable arm for establishing a drive-force transmitting path extending from said motor to said supply reel shaft, responsive to displacement thereof;

a rotatable control arm for causing said rotatable arm to turn when turned in accordance with manual operation position of said main control member; and a member for adjusting a time instant when said rotatable arm is started to turn by said rotatable control arm in such a manner that said rotatable arm reaches its operational position before said switch closes.

8. A cassette type tape recorder as claimed in claim 7 in which said adjusting member comprises an adjusting screw engaged with said rotatable arm.

9. A cassette type tape recorder as claimed in claim 8 in which said rotatable control arm is provided with a resiliently deforming member, said member coming to push the end of said adjusting screw on said rotatable arm.

10. A cassette type tape recorder as claimed in claim 9 in which said resiliently deforming member comprises a torsion spring, one arm part of said torsion spring coming to push the end of said adjusting screw.

11. A cassette type tape recorder as claimed in claim 6 in which said drive-force transmitting path comprises a gear driven by said motor and a driven gear which comes to mesh with said drive gear and is rotated to drive said supply reel shaft.

* * * * *